US009152918B1

(12) United States Patent
McNair (10) Patent No.: US 9,152,918 B1
(45) Date of Patent: Oct. 6, 2015

(54) RESOURCE FORECASTING USING BAYESIAN MODEL REDUCTION

(71) Applicant: Cerner Innovation, Inc., Lenexa, KS (US)

(72) Inventor: Douglas S. McNair, Leawood, KS (US)

(73) Assignee: Cerner Innovation, Inc., Kansas City, KS (US)

( * ) Notice: Subject to any disclaimer, the term of this patent is extended or adjusted under 35 U.S.C. 154(b) by 311 days.

(21) Appl. No.: 13/738,149

(22) Filed: Jan. 10, 2013

Related U.S. Application Data (60) Provisional application No. 61/585,103, filed on Jan. 10, 2012.

(51) Int. Cl.
 *G06N 7/00* (2006.01)
 *G06N 5/02* (2006.01)

(52) U.S. Cl.
 CPC . *G06N 5/02* (2013.01); *G06N 7/005* (2013.01)

(58) Field of Classification Search
 None
 See application file for complete search history.

(56) References Cited

U.S. PATENT DOCUMENTS

| 7,519,705 | B1* | 4/2009 | Papagiannaki et al. | 709/224 |
|---|---|---|---|---|
| 2001/0013008 | A1* | 8/2001 | Waclawski | 705/10 |
| 2003/0154282 | A1* | 8/2003 | Horvitz | 709/226 |
| 2004/0054850 | A1* | 3/2004 | Fisk | 711/112 |
| 2005/0104880 | A1* | 5/2005 | Kawahara et al. | 345/419 |
| 2007/0253599 | A1* | 11/2007 | White et al. | 382/107 |
| 2008/0147441 | A1* | 6/2008 | Kil | 705/2 |
| 2010/0161316 | A1* | 6/2010 | Haug | 704/9 |
| 2011/0318270 | A1* | 12/2011 | Walder et al. | 424/9.1 |
| 2012/0150498 | A1* | 6/2012 | Shastri et al. | 703/2 |
| 2013/0151441 | A1* | 6/2013 | Archambeau et al. | 706/12 |
| 2013/0275350 | A1* | 10/2013 | Schaffer et al. | 706/12 |

OTHER PUBLICATIONS

Guo, H. et al. "A survey of algorithms for real-time Bayesian network inference." AAAI/KDD/UAI02 Joint Workshop on Real-Time Decision Support and Diagnosis Systems. Edmonton, Canada, 2002.*

(Continued)

*Primary Examiner* — Jeffrey A Gaffin
*Assistant Examiner* — Benjamin Buss
(74) *Attorney, Agent, or Firm* — Shook, Hardy & Bacon, L.L.P.

(57) ABSTRACT

A predictive model forecasts a medical resource need by making use of empirical Bayes estimation methods to determine a Dynamic Bayes Network (DBN) model. Exemplary resource needs that may be forecast include nurses, ventilators, hospital rooms, etc. The DBN model is estimated from retrieved data that is related to the resource to be forecast. The DBN model is simplified and a predictive model is generated based on the simplified model. The predictive model runs to forecast the predicted need for the resource. Embodiments are directed toward a predictive model development system that instructs an operator as to the structure of the data so that a model may be tailored based on the understanding of the operator. Embodiments are directed toward a model running system that indexes available models and also employs powerful statistical analysis techniques on behalf of a user to generate a predictive model with little or no user involvement in low-level modeling details.

15 Claims, 9 Drawing Sheets

(56) References Cited

OTHER PUBLICATIONS

Bruneau, P. "Search for predictive generic model of aqueous solubility using Bayesian neural nets." Journal of chemical information and computer sciences 41.6 (2001): 1605-1616. DOI:10.1021/ci010363y.*

Gelfand, Alan E., and Sujit K. Ghosh. "Model choice: a minimum posterior predictive loss approach." Biometrika 85.1 (1998): 1-11.*

* cited by examiner

| TIME INDEX | D2 RN | D1 CENSUS | D1 RN | D1 PAT RN | D1 Q1 APS | D1 Q2 APS | D1 Q3 APS | D1 Q4 APS | D1 ARX | D1 PRED ARX |
|---|---|---|---|---|---|---|---|---|---|---|
| 1-1 | 14 | 21 | 12 | 1.8 | 8 | 6 | 5 | 2 | 5 | 7 |
| 1-2 | 12 | 24 | 14 | 1.7 | 10 | 6 | 7 | 1 | 4 | 6 |
| 1-3 | 11 | 24 | 12 | 2.0 | 11 | 6 | 3 | 4 | 8 | 5 |

| | D2 RN | D1 CENSUS | D1 RN | D1 PAT RN | D1 Q1 APS | D1 Q2 APS | D1 Q3 APS | D1 Q4 APS | D1 ARX | D1 PRED ARX |
|---|---|---|---|---|---|---|---|---|---|---|
| D2 RN | -0.22 | -0.36 | 0.59 | 7.23 | -0.29 | 0.25 | 4.52 | -1.83 | 0.56 | -3.00 |
| D1 CENSUS | 8.64 | -1.41 | -4.13 | 8.85 | -1.34 | -0.28 | 5.94 | -1.21 | -0.54 | -2.74 |
| D1 RN | 5.88 | -1.20 | -3.35 | 12.51 | -1.46 | -0.14 | 12.61 | -0.80 | -0.87 | -3.83 |
| D1 PAT RN | 8.34 | -0.29 | -0.17 | 11.35 | 0.17 | -0.13 | -0.30 | -1.64 | 0.39 | -1.11 |
| D1 Q1 APS | 10.78 | -1.18 | -3.06 | -2.03 | -0.82 | -0.46 | -2.17 | -0.84 | 0.07 | -0.10 |
| D1 Q1 APS | 3.07 | -0.56 | -2.28 | 3.94 | -1.19 | 0.20 | 10.22 | 0.45 | -0.63 | -1.66 |
| D1 Q3 APS | -3.73 | 0.45 | 1.17 | 9.86 | 0.38 | 0.21 | 3.64 | -0.29 | -0.19 | -1.30 |
| D1 Q4 APS | -8.94 | -0.23 | -0.82 | 11.93 | -0.20 | 0.08 | 4.70 | -1.01 | -0.60 | -3.23 |
| D1 ARX | 2.40 | -1.14 | -1.05 | 0.11 | -1.47 | 0.15 | 11.16 | -1.24 | 0.27 | -3.78 |
| D1 PRED ARX | 1.25 | -1.03 | -1.03 | 3.67 | -1.07 | 0.37 | 5.49 | -2.40 | 0.79 | -3.92 |

| | D2 RN | D1 CENSUS | D1 RN | D1 PAT RN | D1 Q1 APS | D1 Q2 APS | D1 Q3 APS | D1 Q4 APS | D1 ARX | D1 PRED ARX |
|---|---|---|---|---|---|---|---|---|---|---|
| D2 RN | 0 | 0 | 0 | 1 | 0 | 0 | 1 | 0 | 0 | 1 |
| D1 CENSUS | 1 | 0 | 1 | 1 | 0 | 0 | 1 | 0 | 0 | 1 |
| D1 RN | 1 | 0 | 1 | 1 | 0 | 0 | 1 | 0 | 0 | 1 |
| D1 PAT RN | 1 | 0 | 0 | 1 | 0 | 0 | 0 | 0 | 0 | 0 |
| D1 Q1 APS | 1 | 0 | 1 | 0 | 0 | 0 | 0 | 0 | 0 | 0 |
| D1 Q1 APS | 1 | 0 | 0 | 1 | 0 | 0 | 1 | 0 | 0 | 0 |
| D1 Q3 APS | 1 | 0 | 0 | 1 | 0 | 0 | 1 | 0 | 0 | 1 |
| D1 Q4 APS | 0 | 0 | 0 | 0 | 0 | 0 | 1 | 0 | 0 | 1 |
| D1 ARX | 0 | 0 | 0 | 1 | 0 | 0 | 1 | 0 | 0 | 1 |
| D1 PRED ARX | | | | | | | | | | |

RESOURCE FORECASTING USING BAYESIAN MODEL REDUCTION

CROSS-REFERENCE TO RELATED APPLICATIONS

This application claims the benefit of U.S. Provisional Application No. 61/585,103, titled "Resource Forecasting Using Bayesian Model Reduction," filed Jan. 10, 2012, which is hereby expressly incorporated by reference in its entirety.

SUMMARY OF THE INVENTION

The present application is directed toward embodiments of a computer-readable storage medium with instructions that, when executed by a processor, are operable to perform a method of resource forecasting. Medical records are retrieved in the form of a first data set that contains data related to resource usage. Examples of resources include a patient room, an ICU nurse, and a ventilator. Exemplary resource usage data includes a record of the actual number of resources needed during a time interval, and contextual data that may be indicative of resource needs at a future time. A retrieved data set is processed to determine a Dynamic Bayes Network (DBN) model following generally an empirical estimate according to the methods of Bayesian node estimation. The DBN model is simplified and used to generate a predictive model. The predictive model is stored and indexed by a health records modeling system. The predictive model runs to forecast resource need.

In embodiments, a health records system comprises a distributed Adaptive Agent operating system that hosts a number of services on a set of client and server computers. A time series forecast service interacts with a user to define a user description comprising a resource that needs to be modeled and a desired use context of the resource. A model indexing service determines whether or not there are models close to the desired model that have been previously developed. If a model exists that is close enough in context and in performance to that which is desired by the user, the model is retrieved and run to forecast the resource. If no sufficient model exists within storage, then a predictive model is compiled for the user. The user description is passed on to a predictive model calculating service that compiles a predictive model by accessing a database within a hospital electronic health record system to retrieve data related to resource usage such as usage determination data and resource context determination data. Retrieved data is reformatted and provided to a library function that estimates a DBN network through a library call. The DBN network is simplified and used to generate a time series based on the simplified model. The time series of the simplified model is then used to estimate the parameters for a topology of a predictive model. The predictive model is validated and stored in computer storage accessible to a model indexing service. The predictive model runs to forecast resource need.

BRIEF DESCRIPTION OF THE SEVERAL VIEWS OF THE DRAWINGS

The present invention is described in detail below with reference to the attached drawings wherein.

DETAILED DESCRIPTION

Embodiments of the present invention provide systems and methods for medical resource forecasting. For the purpose of illustrating exemplary operation of the systems and methods, particular configurations are presented and described herein. The techniques described are not limited to the particular problem or to the context in which they are described for purposes of illustration.

The subject matter of the present invention is described with specificity to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein.

The invention may be described in the general context of computer-executable instructions, such as program modules, being executed by a computer or server. Generally, program modules include routines, programs, objects, scripts, components, data structures, etc., that perform particular tasks or implement particular abstract data types. The invention may be practiced with a variety of computer or server configurations, including handheld devices, smartphones, personal digital assistants, tablet computers, mini tablet computers, laptop systems, desktop systems, multiprocessor systems, microprocessor-based or programmable-consumer electronics, workstations, minicomputers, mainframe computers, and the like. Networks include typical networks such as the Internet, wireless networks, and private networks such as wireless routers or enterprise networks. The invention may also be practiced in distributed-computing environments where tasks are performed by remote-processing devices that are linked through a communications network. In a distributed-computing environment, program modules may be located in both local and remote computer-storage media including memory storage devices.

Embodiments of the present invention may be embodied as, among other things, a method, system, or computer-readable medium. Accordingly, the embodiments may take the form of a hardware embodiment, a software embodiment, or an embodiment combining software and hardware. In one embodiment, the present invention takes the form of one or more computer-readable media that include computer-useable instructions embodied thereon.

Computer-readable media include both volatile and nonvolatile media, removable and nonremovable media, and contemplate media readable by a database, a computer, and various other computing devices. By way of example, and not limitation, computer-readable media comprise computer-storage media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, eDRAM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Resource forecasting predicts the future need for a resource. A resource is an entity that may be deployed for service. Examples of a resource include a worker, a worker with a particular skill set, a piece of equipment, a product, a consumable, a vehicle, an article of manufacture, a physical location, an equipped section of floor space, a device, a piece of capitol, or the like. A composite resource, consisting of two or more particular resources may also be generically referred to as a resource.

There are costs associated with employing a resource, therefore the number of resources that are deployed for use is held to a minimum to avoid unnecessary expenditures. However, there are also costs associated with under-deployment of resources. In the short-run, while additional resources are being prepared for deployment to meet demand, one or more negative effects of underdeployment may be experienced. For example, substitutes that are used in the short-run may be more expensive.

Medical resources are generally associated with medical services provided at a point of care facility such as a clinic, a hospital, a ward, an impatient unit, a pharmacy, a treatment station, an inventory station or a visitation cite. Examples of a medical resource include a nurse, a ward clerk, a specialist, an emergency technician, an ambulance, a ventilator, an intensive-care nurse, a medical device, a quantity of medicine, an anesthesia machine, a home-health nurse, a home-health vehicle, a quantity of stock, a quantity of a medical supply, an exam room, an operating room, a diagnostic suite, etc.

In embodiments, medical resource forecasting predicts demand for vehicles, drivers, or nurses for a home health-care service. For example, a pool of patients reside at a corresponding set of visitation cites. The number of nurses deployed for the service of patients in the pool is predicted day-to-day, so that an accurate number of nurses needed for the pool on the following day is known. In this scenario nurses are notified of their deployment on the day before they are needed.

In embodiments, the quantity of a certain medication used from a warehouse, a pharmacy, or a replenishment station is forecast. For example, an inpatient unit keeps a stock of the modeled medication in a replenishment station for ready access, and replenishes the stock once per shift. The predicted need for the modeled medication in a shift is used to determine how much medication is needed, and so this prediction is used to determine the amount of space in the replenishment station that is used for the modeled medication. Thus a fixed-size replenishment station through modeling increases efficiency by creating room to stock additional medications for ready access in the replenishment station.

In embodiments, the nursing staff size, the number of mechanical ventilators, or the number of active treatments provided by an intensive care unit (ICU) is forecast. For example, the number of nurses needed on the following day is predicted. Thus nursing staff may be informed about staffing needs for the following day during a current shift, and staffing can therefore be arranged more effectively, easily, and at a lower expense than if temporary or on-call resources were deployed to fill intensive-care nursing needs.

For most use-cases and venues, prior art predictions based on census, conventional health-care variables, and severity of illness have not yielded sufficiently precise and accurate forecasts. Resource prediction for ICU resources have historically been very challenging for a number of reasons. The length of stay for patients residing in an ICU is typically long for a significant fraction of patients. Approximately 20 percent have a length of stay more than five days. Frequently, patients enduring long stays in the ICU still have evolving resource needs on the sixth day. Additionally, some inputs to prediction may be poor indicators of resource needs. When poor predictors are incorporated into a resource decision, they may decrease precision, accuracy, and reliability of the predicted resource need. However, identifying the variables that are poor indicators is difficult. Humans tend to be biased when evaluating data. People tend to be superstitious and to follow hunches and traditional beliefs, so they are likely to emphasize the wrong variables.

Figure 1:
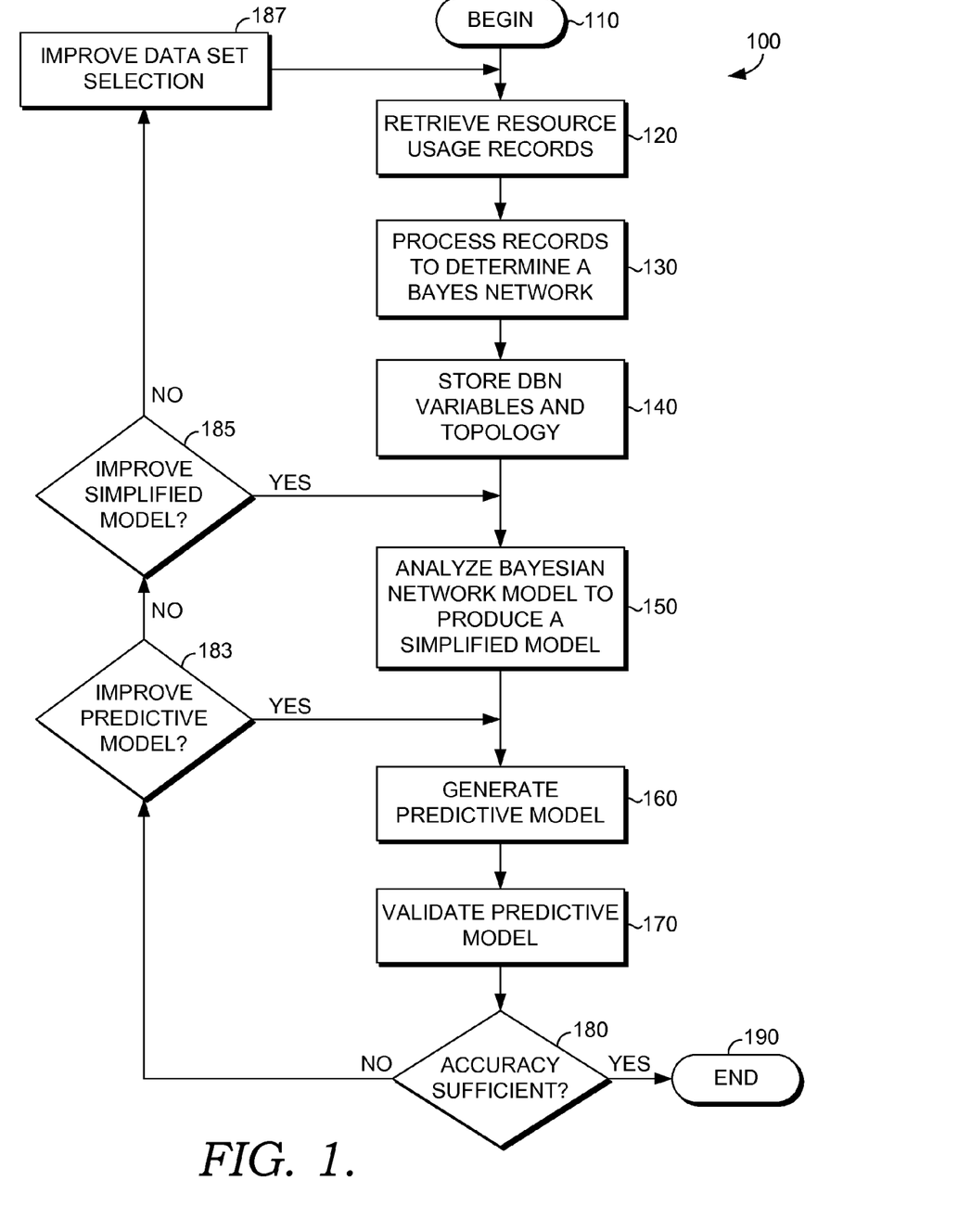
FIG. 1 is a flow diagram of an exemplary method of compiling a Predictive Model for medical resource forecasting.
Figure 3:
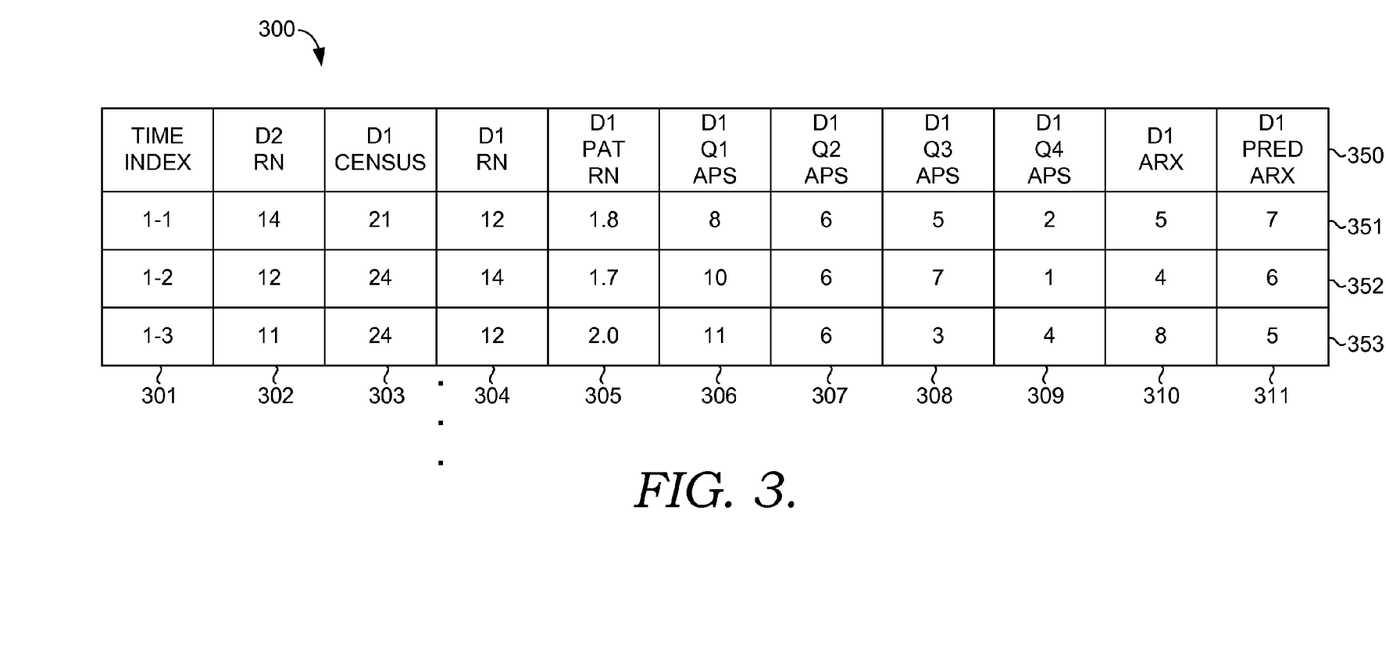
FIG. 3 is an exemplary illustration of a portion of a data set comprising historical medical data related to resource usage.
Figure 4:
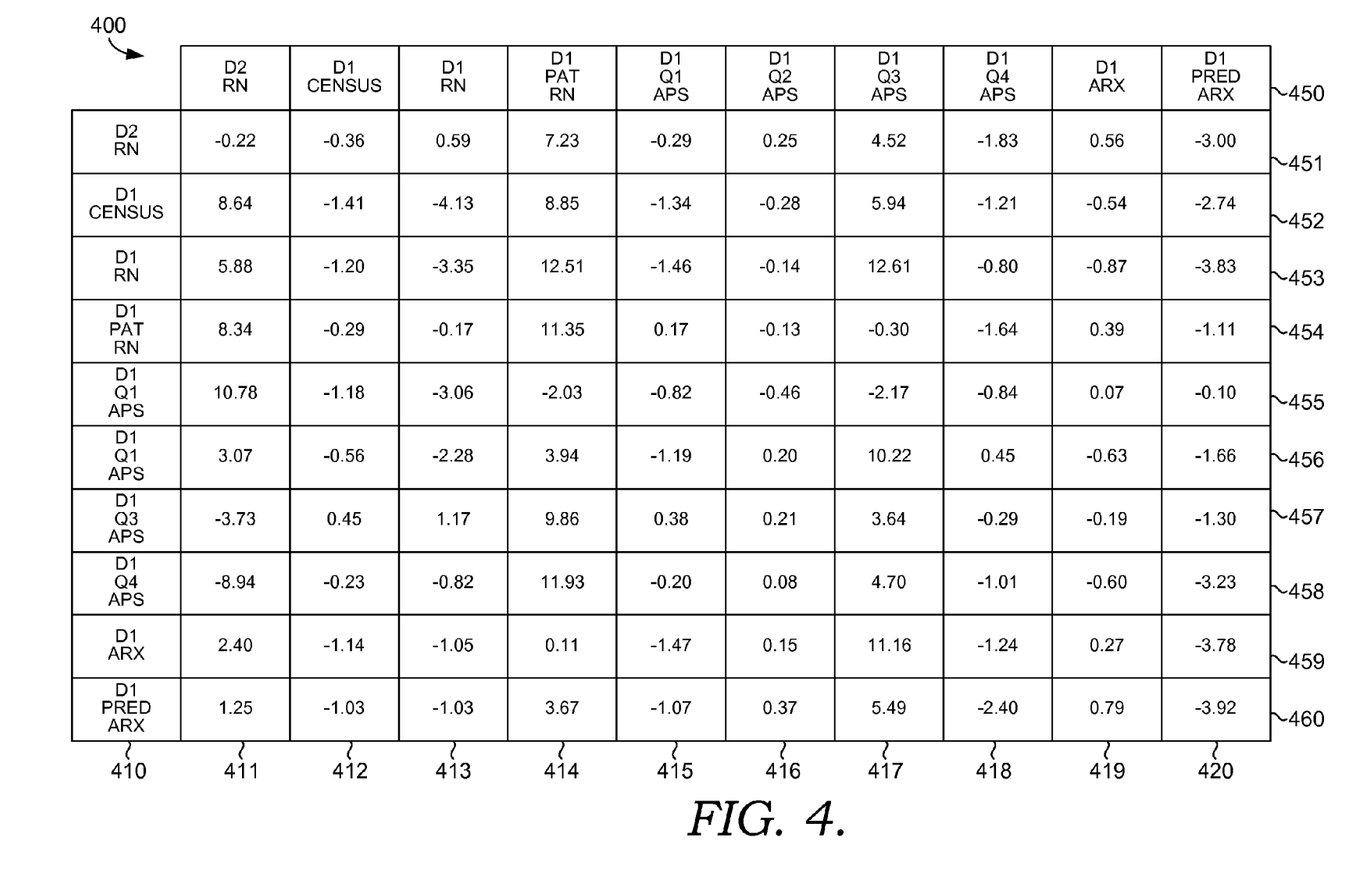
FIG. 4 is an exemplary illustration showing data pertaining to a model estimated according to an Empirical Dynamic Bayes Network.
Figure 5:
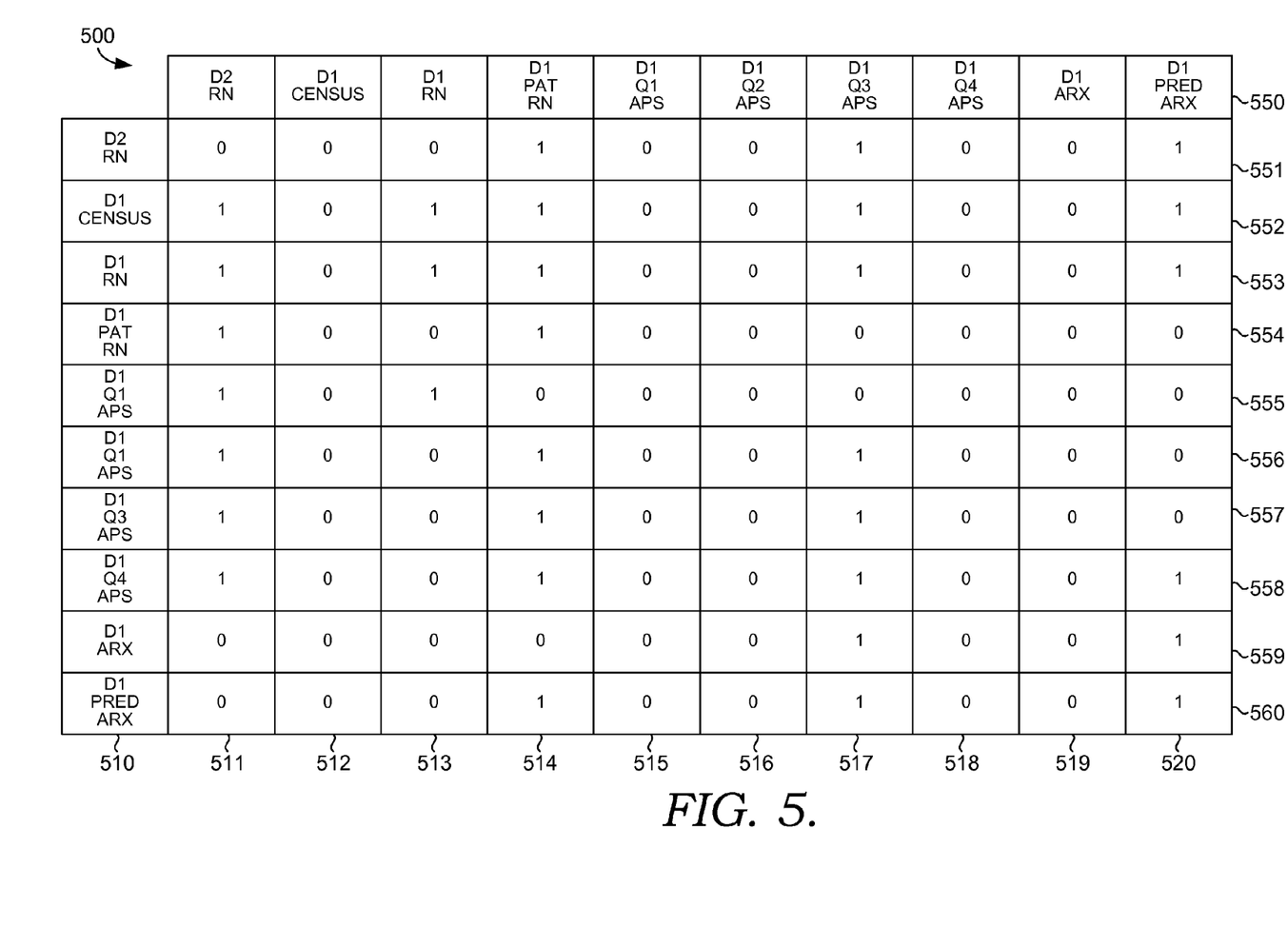
FIG. 5 is an exemplary illustration showing a reduction in the number of Bayesian node elements to produce a simplified model.

By way of illustration, FIG. 1 shows in flow diagram 100 an exemplary method for compiling a Predictive Model for resource forecasting to produce a simplified model. At 110 the method begins and flow proceeds to 120 in which records of a data set are retrieved that have historical medical data related to resource usage. Records are generally data elements that are stored within a computer such as client 842, Health Record system 860, or server 820 of FIG. 8. Embodiments of Record System 860 include a Storage Area Network (SAN). Records are retrieved by a program such as predictive models calculating service 826 of FIG. 8. Exemplary records are depicted in FIG. 3. At 130 records are processed to determine a Bayes Network such as a Dynamic Bayes Network (DBN), as further described by FIG. 2. At 140 the variables and topology of the DBN are stored in computer storage. Exemplary variables associated with the DBN topology are depicted in FIG. 4. At 150 the DBN model is analyzed to produce a simplified model. Results of such an analysis are depicted in the data of FIG. 5. At 160 a predictive model is generated. Embodiments generate an Auto Regressive Moving Average (ARMA) model, which predicts resource usage. Embodiments generate an Auto Regressive Integrated Moving Average (ARIMA) model, which also predicts resource usage. An ARIMA generally refers to any model that comprises a combination of one or more of an autoregressive model, an integrated model, and a moving average model. The descriptive parameters that constitute the topology and the coefficients of the predictive model are stored in computer data storage for future use. At 170 the generated predicted model is validated, for example, by running the predictive model on a test data set, and comparing the output of the predictive model to actual resource needs. At 180 the accuracy of the validation run of the predictive model is evaluated. If the accuracy of the predictive model is sufficient for needs, the method proceeds to 190 and the compilation of a predictive model is complete.

Alternatively, if the accuracy is not sufficient, embodiments of the method determine a set of improvements to be attempted. The method proceeds to 183 where a test is made to determine whether or not to improve the predictive model. If improvements to the predictive model are indicated, then a change is made to the predictive model in an attempt to improve the predictive model, and the method returns to block 160. An exemplary improvement is to lengthen the model order of an ARMA model in an attempt to improve accuracy. An alternative exemplary improvement is to use an additional predictive model structure. For example, an ARIMA model may be chosen after an ARMA model has been attempted. If improvements to the predictive model are not indicated then the method proceeds to 185 where a test is made to determine whether or not to improve the simplified model. If improvements to the simplified model are indicated, then an improvement is chosen and the method proceeds to 150. An exemplary improvement to the simplified model is to modify a threshold used to determine the number of elements included in the simplified model. An alternative exemplary improvement in the simplified model is to use a different method of analysis of the Bayesian Network model that produced the simplified model. If improvements in the simplified model are not indicated at 185, the method proceeds to 187 where an improvement to the data set selection is performed. For example, the set of data used for modeling is expanded to include additional records that pertain to variables that have not previously been retrieved or processed to determine the Bayes Network. The method then proceeds to 120.

Embodiments of method 100 proceed with predetermined criteria for evaluating accuracy and making improvements so that the method may proceed from 110 to 190 as an automated library function with little or no user input. Embodiments perform a database query at 120 related to a resource previously identified by the user. The query returns a data set consisting of resource-associated data for use in method 100. Embodiments at 180 determine a number of alternative models to generate and evaluate for accuracy and the most accurate model is selected at 180 after running through all planned models. Embodiments for example, determine three alternative predictive model architectures, four levels of detail for the simplified model, and two data set selections to be employed. The method of 100 then executes the 24 different combinations in this example, and selects the most accurate model at 180 after all planned models have been executed. Embodiments at 180 compare a statistical accuracy of a test run to a predetermined accuracy goal, and proceed to 190 when performance exceeds this goal.

Embodiments at 120 process raw data records in such a way as to remove a time-dependent deterministic component present in the data so that the stationary assumption more properly applies to the preprocessed data. For example, the records may comprise data for three shifts that naturally differ deterministically by shift such as day shift, evening shift, and night shift. The influx of patients into an ICU is more likely to occur during the day shift. Therefore, the data set may be partitioned to include a time series only for a certain shift, such as the day shift. Alternatively or additionally, a time dependant component may be estimated, and the raw data processed to remove the deterministic time-dependent fluctuation so that the data is modeled after preprocessing. Preprocessed data is a residual after a time-dependent component is subtracted off the raw statistic. After modeling, the deterministic component is added back in to form a prediction. Similarly, a data set may be formed by preprocessing to take into account time of week or time of year. Certain days are known to be far different from other days. For example, the fourth of July is far more likely to have an influx of patients into a burn unit. Certain surgeries are scheduled on a certain day of the week, and so the next day, or the same day are more likely to generate related care. When speaking of a data set herein, this refers generally to the case of either raw data or preprocessed data.

Embodiments of method 100 proceed with user input and feedback as the method proceeds. At 120, and/or at 187, a user is presented with a display showing data record descriptions. Embodiments of these record descriptions also indicate the quantity of data available, the context of the data collection, and other related contexts that may be either broader or narrower than the present context for the resource need that is to be predicted. Embodiments receive a user definition of the scope of the context used for modeling. For example, a user selects a unit type (e.g., ICU, behavior, cardiology, maternity), a set of locations (e.g., a local hospital, family of related hospitals, or all cites having available data), and a set of operator contexts (e.g., a set of administrative constraints, a set of provider capabilities, a maximum census). At 150 a display of a simplified model is presented to the user for review and/or modification. For example, a pareto display of rank-ordered absolute Z-score is presented highlighting those elements that are included and also providing a display of those that are excluded. A threshold input slider or the equivalent is presented to the user with a slider control for adjusting the threshold value, and the display updates showing the fraction and/or location of the elements that are retained in the model. At 180 a display quantifies for user review the accuracy of the resultant model. Actual and predicted resource values are presented on the same data plot with disagreements highlighted. Alternative models are ranked for probability of error on the high side and low side. A user input indicating approval of a final model is received by calculating service 826 of FIG. 8, and the model is assigned an identifier and a visual description, and is stored in computer storage for later retrieval and use by model indexing service 828, and by time series forecast service 822. If calculating service 826 receives a user input indicating desired improvement of the model at 180, the method proceeds to 183. A menu, dialogue box, or other graphical user interface presents to the user parameters within the predictive model that might be adjusted to attempt improvement. Upon selection of a predictive model improvement, the method proceeds to 160. Alternatively, when improvement of the predictive model is not desired, the method proceeds to 185, where the calculating service 826 receives an input indicating that the user would like to improve the simplified model at 185, whereupon the method proceeds to 150. Otherwise, the method proceeds to 187.

Embodiments of method 100 use the data set to provide for independent evaluation of the predictive model that is estimated. For example, a data set is partitioned into an earlier and a later data set. Out of perhaps a thousand time instances of records, the earlier set of 900 samples is used at 130 to perform the estimation, and the most recent 100 samples are used at 170 to run a predictive model to evaluate accuracy. Embodiments partition the data set into two approximately equal parts.

Figure 2:
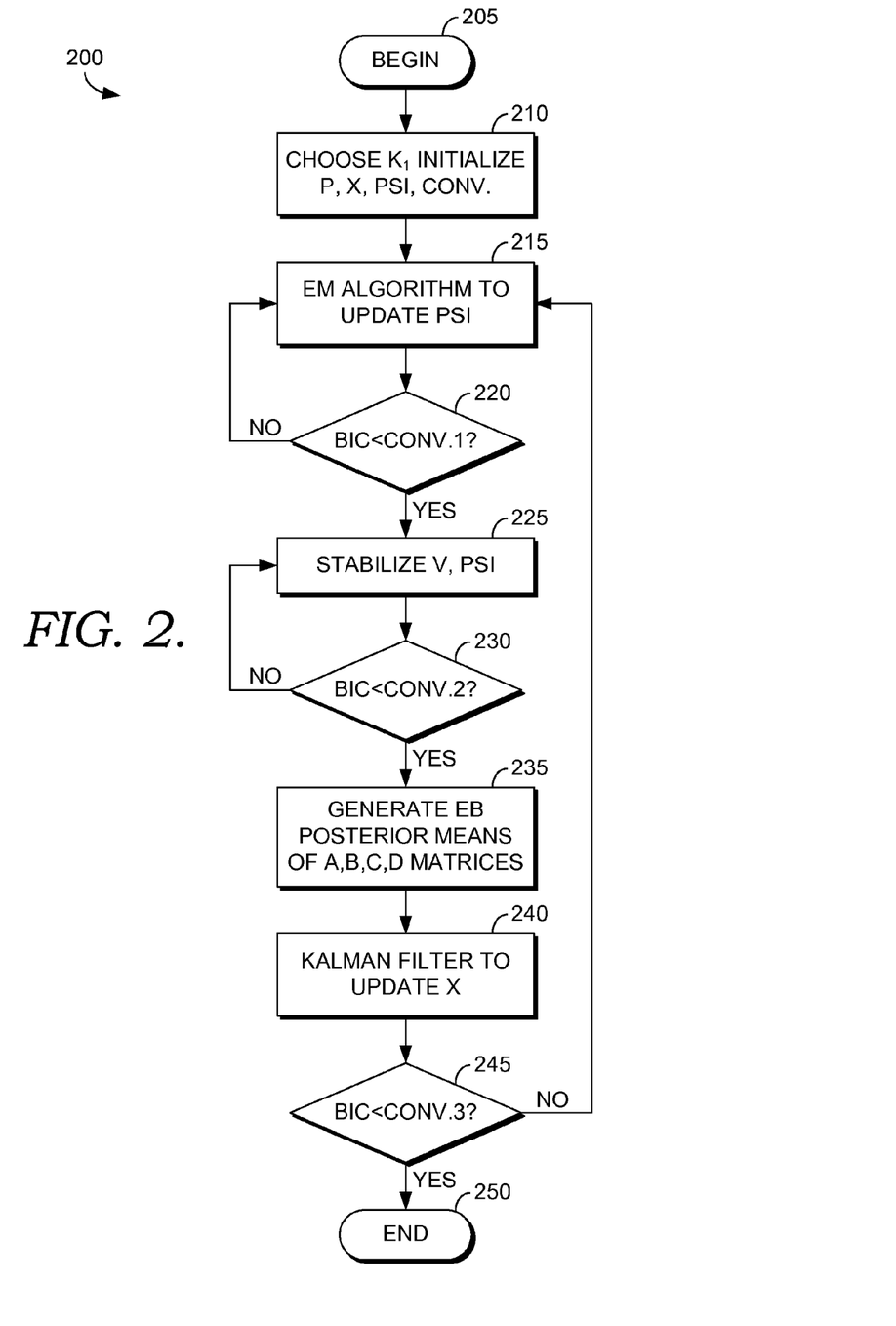
FIG. 2 is a flow diagram showing an exemplary method of determining a Bayesian network model consisting of Bayesian node elements.

Turning now to FIG. 2, there is depicted in 200 a flow diagram of an embodiment of 130, showing in further detail an exemplary method of determining a DBN model consisting of Bayesian node elements. A DBN model as used herein indicates a state model consisting of system state elements and state transition elements. A system state generally refers to a vector of variables that are equal to an array of values at a reference time instant. State variables are either observable at this reference time instant, or hidden, that is, not being directly observable at the reference time instant. DBN models generally encompass models developed using Bayesian Programs, Bayesian Networks, Bayesian Filters, Recursive Bayesian Filters, Hidden Markov Models, Particle Filters, Discrete Hidden Markov Models, Semi-continuous Hidden Markov Models, Continuous Markov Models, and Kalman Filters. Embodiments employ a predictive Bayesian filter that estimates a portion of a state vector at a time instant at a discrete number of time steps k in the future from a reference time instant given a set of observation vectors at time zero up to the reference time instant. Bayesian node elements generally include state nodes, interconnections between state nodes, and a modeled probability mechanism for transitioning between states of the system.

Embodiments of a DBN make the stationary assumption, involving the approximation that the state model at one instant is the same as the state model at another instant. Embodiments of a DBN make the assumption that the state at a time instant depends only upon the state at the previous time instant. Embodiments specify the behavior of the system entirely by determining a state transition model. Embodiments determine as a matrix the hidden state transition model from the hidden state i−1 to hidden state i given the hidden state at i−1. Embodiments determine as a matrix the a priori probability of each state value. Embodiments determine as a matrix the observation vector at time i given the hidden state value at time i. Embodiments determine conditional probability tables assuming a Gaussian form for the transition probability density function. Embodiments determine a transition model from a set of experimental data.

The flow diagram 200 begins at 205 with a data set that includes historical medical data, such as that illustrated in part by 300 of FIG. 3. The data set is used as a basis for estimating an underlying DBN model given the data. Row 350 of the illustrated portion of data set 300 contains a written description for each column of data having values illustrated by exemplary rows 351, 352, and 353. Embodiments of partial data set 300 include thousands of like rows. Columns 301-311 illustrate the description and constituent data for the illustrated portion of partial data set 300. Within column 301, row 350 indicates that the data in this column pertains to time index. There are three time indexes illustrated by 1-1, 1-2, and 1-3; thereby indicating week 1 and days 1, 2, and 3 respectively. Within column 302, row 350 indicates that column 301 pertains to the number of nurses needed on day 2. Column 302 provides data to document a hidden markov state, that is determined for estimating the DBN by time shifting column 304 by a single day. Column 304 is an example of resource usage determination data. Therefore, according to column 302, the historical data had indicated 12 nurses were needed for time 1-2, and 11 nurses were needed for time 1-3. Within column 303, row 350 indicates an observed state representing the number of patients that were present in the ICU on a given day. At time 1-1, 1-2, and 1-3 there were, respectively, 21, 24, and 24 patients in the ICU. Within column 304, row 350 indicates that column 304 contains the number of nurses that were determined to be needed at the close of a shift. The number of nurses in this column indicates actual number needed over the designated time, including both scheduled and those temporarily drawn from a float pool to meet demand. Thus for time 1-1, 1-2, and 1-3 there were, respectively 12, 14 and 12 nurses needed. In embodiments, data items are included within the data set as usage determination data that are able to be processed to quantify understaffing or overstaffing during a shift. For example, if administrative data may be delayed to the end of a shift when the nursing staff is short-handed, then a late time of entry for administrative data would be an indication that the unit was short-handed. Likewise, a very short response time for attendant calls could be used as an indicator that the unit is over-staffed. Within column 305, row 350 indicates that column 305 contains the patient-to-nurse ratio. Columns 306-309, and Column 311 are examples of context determination data that reflect the context of the unit at the time of the staffing. Columns 306-309 and 311 pertain to a patient physiology evaluation system such as Acute Physiology and Chronic Health Evaluation (APACHE®) system. A physiology evaluation system evaluates patients on multiple factors that indicate the health status of a patient. Column 306 contains the number of patients within the unit that are within the first quartile of the APACHE Physiology Score (APS). Likewise, columns 307, 308 and 309 contain, correspondingly, the number of patients within the unit that are within the second, third, and fourth quartile of APS score. Within column 310, row 350 indicates the number of Active Prescriptive procedures (ARx) that are performed on the unit for each time period. Thus for period 1-1, 1-2, and 1-3, there were 5 active orders, 4 active orders, and 8 active orders, respectively. Column 311 indicates the number of active procedures that are predicted by the APACHE system given the physiological health of the patients in the unit.

Embodiments of flow diagram 200 use open source DBN estimation package as a basis of estimating a DBN network from experimental data in blocks of flow diagram 200. Embodiments make use of a Kalman filter at 240. If true, the method completes at 250, otherwise the method returns to 215.

After a DBN model is estimated from an available data set, the variables and Topology of the DBN are stored. FIG. 4 shows in 400 exemplary statistics derived from an estimated exemplary state transition model. Exemplary statistics include an estimate of the slope change in magnitude of a state variable at a next time instant given a unit change in the state variable from a present time instant. Exemplary statistics include a Z-score. The Z-score is generally the mean of a random variable divided by the standard deviation of the random variable. Embodiments of Z-score are formed by taking the difference between the means of two random variables and dividing by the geometric mean of the standard deviations of the two random variables. Column 410 gives the state label at a next time instant. Row 450 identifies the variable at a current time instant. The grid shown in rows 451-460 and columns 411-420 represents statistics for every combination of a present state variable and a next state variable. Therefore the Z-score in a grid cell is an indication that the variable identified in column 410 for the next time instant is statistically related to the corresponding variable identified in row 450 in a current time instant. For example, the number in row 453 and column 417 is 12.61; this indicates that the number of nurses needed on the next day is strongly statistically related to the number of patients on the prior day within the ICU that are in the third quartile of APS score. Furthermore, an increase in the number of patients in the sign of the number is positive. This indicates that an increase in the number of patients in the third quartile, will translate into a positive increase in the number of nurses needed. Similarly, the number in row 453 and column 416 is −0.14, reflecting the experimental determination that there is very little relation between first quartile APS and the number of nurses needed the next day. Therefore, there is a very small negative interaction between the two variables. That is, when the number of patients in the second quartile of APS score decreases, there is a very slight drop in the number of nurses needed. Likewise, in row 453 and column 413 is −3.35, reflecting an experimental determination that there tends to be a moderate negative statistical relation between the number of nurses needed on a current day, relative to the number that will be needed on the next day. That is, when there is a positive surge in the number of nurses needed on a first day, it is moderately likely that the number needed on the next day will be relatively diminished. Embodiments display the model data 400 in a rainbow of color, brightness, or shade to reflect the degree to which a combination has significance in the Bayesian model. This gives the user a heat-map view of the important transition variables in the DBN model.

Proceeding to FIG. 5, there is depicted therein an illustration of an exemplary simplified model that is based on the statistics depicted in FIG. 4. A cell within the grid of rows 551-560 and columns 511-520 of FIG. 5 is set to 1 based on a simple threshold of absolute Z-score of the corresponding cell from FIG. 4 is greater than approximately 2.5758, otherwise, the cell is set to zero. This threshold level corresponds to a Z-score level that is designed to eliminate about 99% of the contribution in the model that is due to Gaussian noise only. A corresponding DBN model eliminates those transitions from the model that are represented by a zero, and keeps those transitions that are represented by a 1. Thus, a 100 term transition model is reduced to about 32 transitions. Thus, for the purpose of illustration, the number in row 553 and column 517 corresponds to a Z-score of 12.61 and so this cell is set to 1. Similarly, the number in row 553 and column 516 corresponds to a Z-score of −0.14 and so is set to 0. Likewise, the number in row 553 and column 513 corresponds to a Z-score of −3.35 and so is set to 1. Embodiments receive user input of a threshold to control the number of transitions retained in the model. Embodiments display a rank-ordered display of the absolute Z-score, allowing the user to visually pick a threshold that captures meaningful data. Embodiments automate the identification of a knee in the curve of the pareto display of rank-ordered absolute Z-score, and so determine a number of elements in the model to be retained.

Embodiments of the model simplification may be derived from the data displayed in FIG. 4 through manual or automated means. For example, a user may select columns to indicate which variable from a prior time instant to include in a transition model of the next time instant. For example, a user selects columns 414, 417 and 420, indicating that the patient nurse ratio, the third quartile of the APS score, and the predicted number of active interventions are good variables on which to base an estimator that predicts nursing staff needs. Embodiments automatically select certain variables for inclusion in the model, or alternatively, for deletion. For example, an automated rule that summed the number of 1's in a column from FIG. 5, and eliminated those columns that had a sum below a threshold value would eliminate columns 512, 513, 515, 516, 518, and 519 by using a threshold of 4.

Figure 6:
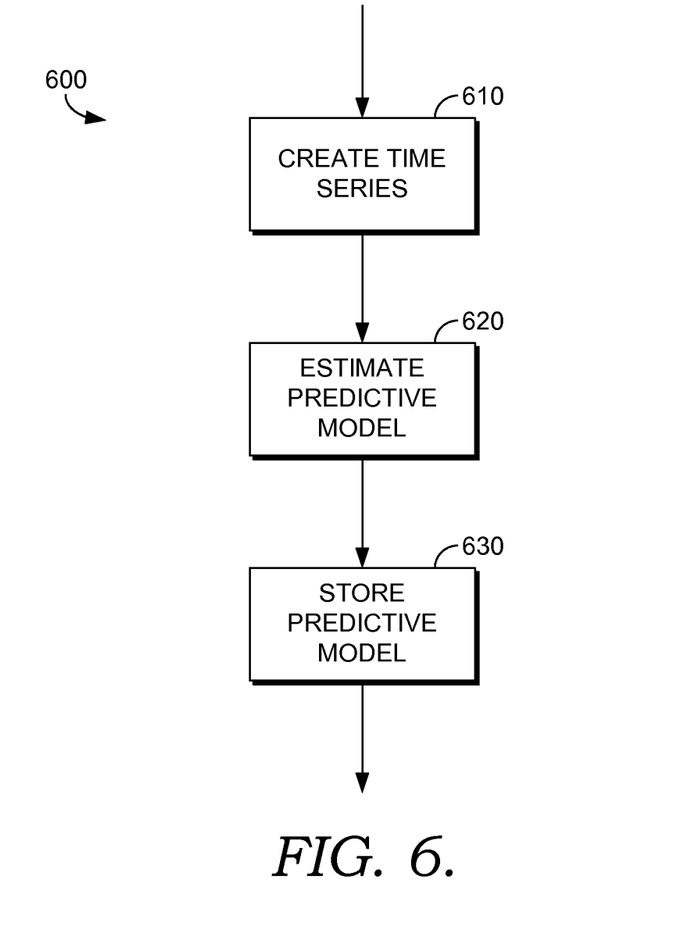
FIG. 6 is an exemplary flow diagram showing an exemplary method for generating a predictive model using a simplified model.

FIG. 6 shows an exemplary flow diagram 600 for generating a predictive model using a simplified model. At 610 a time series is created to provide input to an estimator that estimates a predictive model. Embodiments of 610 simulate the time series using a simplified DBN network as described herein. For example, the simplified model depicted in FIG. 5 representing 32 transition probabilities is executed to produce a large amount of data that mimics the operation of a modeled ICU. The output time series from this simplified DBN is used as an input to 620 where an estimate is formed of the predictive model. Embodiments of 610 select a reduced number of variables from the data set retrieved in 120 to create the time series based on a simplified model. For example, a time series including only number of nurses, patient nurse ratio, third quartile APS score, and APACHE predicted number of active treatments is fed into the estimator of 620.

At 620 a predictive model is estimated based on the simplified model. Embodiments estimate coefficients of an ARIMA model. Embodiments make use of the R-development system within library 824. R is a programming language and software development system provided under the Gnu project. After forming a multivariate vector using the ARIMA model, a test is performed to see if the model has converged. If convergence is achieved, then the method proceeds to 630. Otherwise, a factor in the ARIMA model p is adjusted, and a new multivariate vector is formed.

At 630 the predictive model is stored in computer storage. Embodiments store the predictive model as a set of coefficients in a canonical model such as the ARIMA model. Embodiments store error rates measured during validation, optionally making use of the reciprocal of the validation sample size as an error estimate when there are no counted errors. Embodiments store a numerical situation vector with the predictive model describing the resource predicted, the role of the resource predicted, the context of the resource predicted, the venue of the resource predicted, the administrative environment of the resource predicted, etc. A numerical range is assigned to each value of a vector to allow simple numerical distance calculations to be performed based on the values of the vector. For example, concerning the resource predicted, an exemplary numerical range is 0=admin, 1=LPN with less than one year experience, 2=LPN with less than five years experience, 3=LPN with five or more years experience, 4=BSN with less than one year experience, 5=BSN with less than five years experience, 6=BSN with more than five years experience, 7=Physician intern, 8=Physician resident, 8=Attending Physician. The role of the resource predicted may include admitting, physician, pharmacist, nurse, scheduler, radiology technician, etc. The context of the resource predicted may describe the service unit such as ICU, cardiology, psychological, etc. The venue of the resource may describe the urgency of the care (e.g., admitting, acute care, clinic return for ambulatory visit, pharmacy, retail). The administrative context of the resource may quantify the service capability (e.g., level I trauma center without APACHE®, level II trauma center without APACHE®, level I trauma center with APACHE®, level II trauma center with APACHE®).

Figure 7:
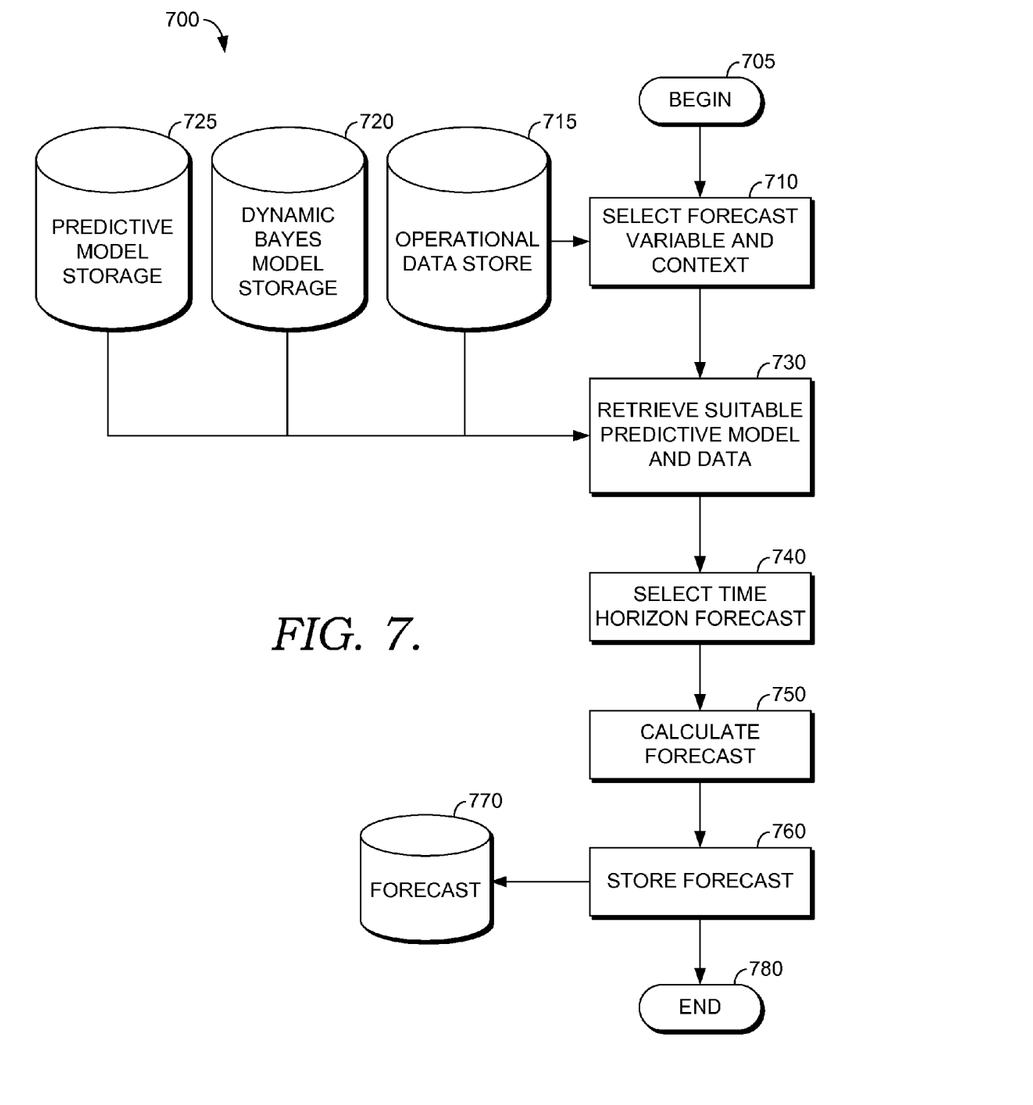
FIG. 7 is a flow diagram showing an exemplary method of running a predictive model to forecast resource needs.
Figure 8:
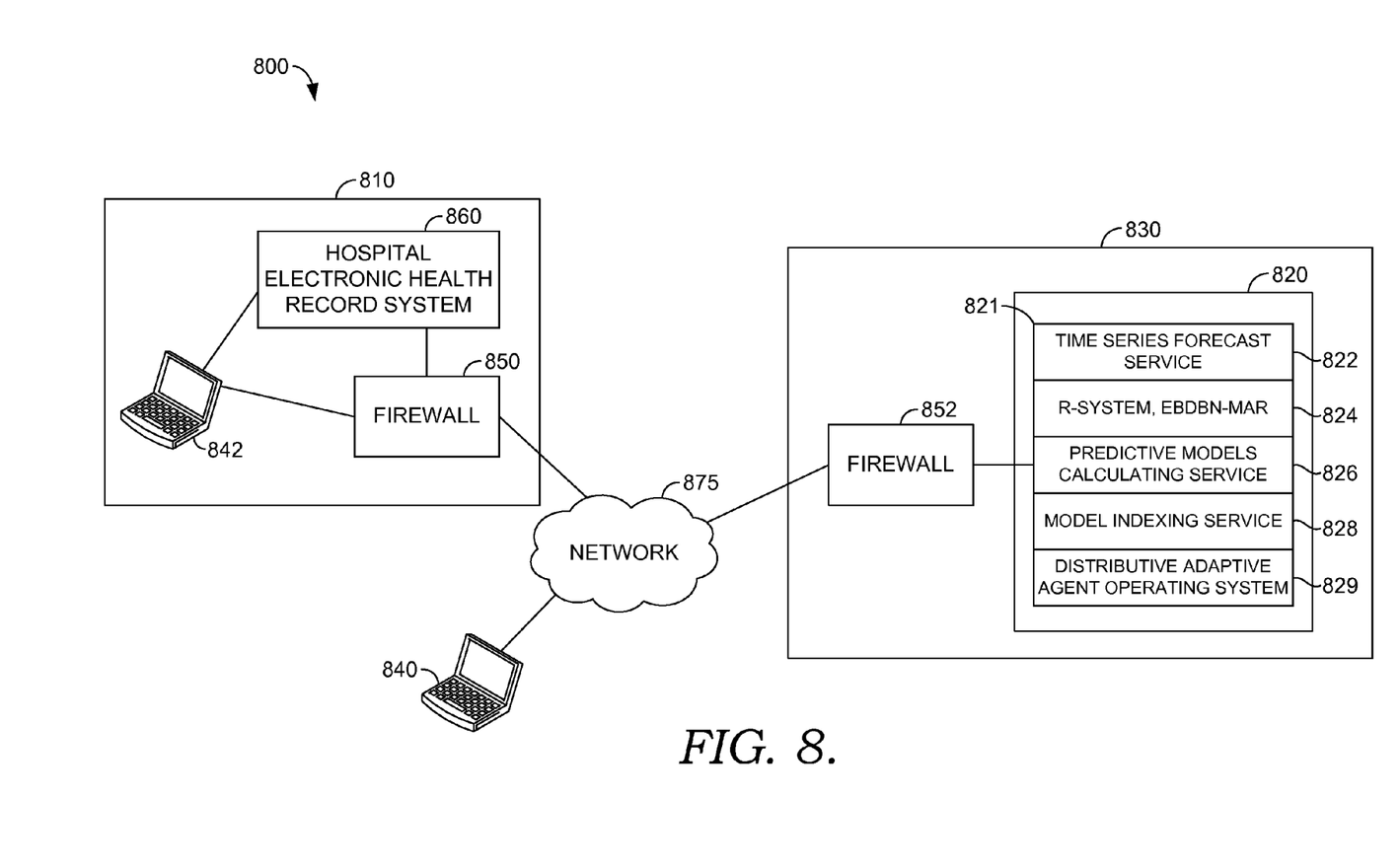
FIG. 8 is an exemplary computerized system for compiling and running a predictive model.

In FIG. 7 a flow diagram 700 for running the predictive model is presented. Embodiments of flow diagram 700 are embodied in computer storage and presented to the user as a time series forecast service 822 that presents an interactive display to a user to permit the forecasting of a wide variety of resources. At 705 the method begins and proceeds to 710 where a forecast variable and situational context are chosen. Embodiments query available data related to a selected resource from operational data store 715. Embodiments allow the user to choose a resource from a menu of text descriptions of resources available in a system database. Embodiments provide a drop-down box for the user to select a textual description corresponding to each value of a situation element in a defined situation vector. At 730 a suitable predictive model and data are retrieved from computer storage. Embodiments make use of model indexing service 828 to perform a norm or distance calculation on the difference between the desired situation vector and the situation vector of stored predictive models. Embodiments return only exact matches. Embodiments list estimated errors based on validation.

Embodiments list experimental history of error rates recorded during use of the model. Embodiments provide a range of returns that are closest in distance, and allow the user to select one of the previously developed models based on written descriptions of the situational context of stored models. Embodiments search over an operational data store 715 that stores models for operational contexts relevant to the location where the study is being performed. Embodiments retrieve a predictive model from storage 725 that stores coefficients and topology necessary to execute the run-time model. Embodiments retrieve a dynamic Bayes model from store 720, and a predictive model is generated based on a stored DBN model. At 740 a time horizon is selected for the forecast. Although a model is developed for predicting the next time instant, it is possible to use a developed model to predict a selected time horizon in the future. At 750 the predictive model is used to calculate the forecast that is stored at 760 in forecast storage 770. The method proceeds to completion at 780.

Moving on to FIG. 8, there is presented in 800 a system diagram of a computerized system for compiling and running a predictive model. A first premise location 810 includes a private network behind firewall 850. Client computers such as 842 communicate with hospital electronic health record system 860 through a private network. In embodiments, computers 850 and 860 are servers that run within a local or distributed private network. Computers such as server 820 within premise 830 connect through firewall 852 to a private network and to public network 875 such as the Internet to other premise 810 equipment and also to public system user computer 840. Embodiments of computer software stack 821 run on a server such as 820 shown in FIG. 8. Embodiments of software stack 821 run as a distributed system on a virtualization layer within computers such as 860, 820 and 840. Embodiments of software stack 821 include a distributed adaptive agent operating system 829 that hosts a number of services such as 822, 824, 826, and 828. Embodiments of software programs 822, 824, 826 and 828 run as a local or distributed stack on a collection of personal computers and servers such as 842, 820, 860, and 840. Model indexing service 828 provides a service that responds to calls from other programs such as time series forecasting service 822 to locate previously stored models. Predictive model calculating service 826 develops predictive models relying on library functions within library 824 which includes statistical calculation packages like the R-system, Empirical Bayes Dynamic Bayesian Network (EBDBN) estimation program, and ARIMA library function mAr.

Figure 9:
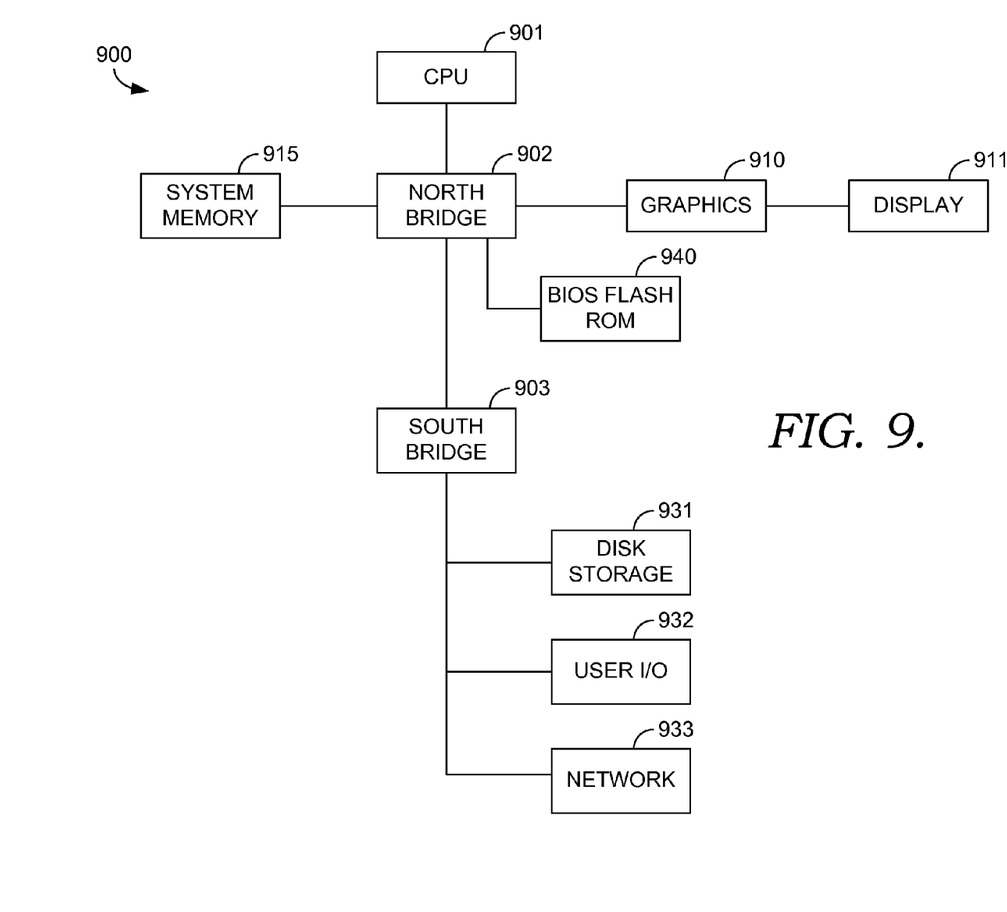
FIG. 9 is a system diagram of an exemplary computer device for storage of data and programs in computer-readable media for performing a computerized method of compiling and running a predictive model.

Turning now to FIG. 9, there is shown an exemplary computer device 900 that has software instructions for storage of data and programs in computer-readable media. Computer device 900 is representative of a system architecture that could be used for computers such as 842, 820 and 860. One or more CPU's such as 901 have internal memory for storage and couple to the north bridge device 902, allowing CPU 901 to store instructions and data elements in system memory 915, or memory associated with graphics card 910, which is coupled to display 911. Bios flash ROM 940 couples to north bridge device 902. South bridge device 903 connects to north bridge device 902 allowing CPU 901 to store instructions and data elements in disk storage 931 such as a fixed disk or USB disk, or to make use of network 933 for remote storage. User I/O device 932 such as a communication device, a mouse, a touch screen, a joystick, a touch stick, a trackball, or keyboard, couples to CPU through south bridge 903 as well.

In some embodiments, computing device 900 is a computing system made up of one or more computing devices. In an embodiment, computing device 900 includes an adaptive multi-agent operating system, but it will be appreciated that computing device 900 may also take the form of an adaptive single agent system or a non-agent system. Computing device 900 may be a distributed computing system, a centralized computing system, a single computer such as a desktop or laptop computer or a networked computing system.

In some embodiments of our invention, computer 900 is a multi-agent computer system. A multi-agent system may be used to address the issues of distributed intelligence and interaction by providing the capability to design and implement complex applications using formal modeling to solve complex problems and divide and conquer these problem spaces. Whereas object-oriented systems comprise objects communicating with other objects using procedural messaging, agent-oriented systems use agents based on beliefs, capabilities and choices that communicate via declarative messaging and use abstractions to allow for future adaptations and flexibility. An agent has its own thread of control, which promotes the concept of autonomy. Additional information about the capabilities and functionality of agents and distributed multi-agent operating systems, as they relate to our invention, is provided in U.S. patent application Ser. No. 13/250,072, filed on Sep. 30, 2011, which is herein incorporated by reference in its entirety.

In embodiments, one or more computer-storage media having computer-usable instructions when executed by a processor facilitate a method for medical resource forecasting. These embodiments comprise retrieving records of a first data set comprising historical medical data related to resource usage. These embodiments comprise processing said records to determine a Bayesian network model consisting of Bayesian node elements. These embodiments comprise analyzing said Bayesian network model to produce a simplified model. These embodiments comprise generating a predictive model using said simplified model and running said predictive model to forecast resource needs.

In some embodiments of a method for medical resource, forecasting said historical data related to resource usage comprises usage determination data and context determination data. Further, some of these embodiments include processing that comprises applying resource usage determination data to incorporate resource need as a hidden state of said Bayesian network, and applying context determination data to incorporate context data as observable states of a Bayesian network. Embodiments of a predictive model include an ARIMA model, which is estimated based on said simplified model. Embodiments of a predictive model include an ARIMA model, which is estimated based on said first data set reduced as a function of said simplified model.

Some embodiments of usage determination data comprise actual usage data and data that is indicative of resource application error. In some embodiments, analyzing comprises comparing the absolute Z-score of one or more node elements to a threshold. In some embodiments, analyzing comprises determining a rank order of absolute Z-score for two or more node elements. In some embodiments, a simplified model is validated in part by comparing predicted resource usage to actual resource usage for a second data set. In some embodiments, a second data set is derived from a first data set by partitioning the first data set, or preprocessing the first data set through estimation of a stationary residual.

As can be understood, the present invention provides systems, methods and apparatuses for compiling and running a predictive model developed using a simplified DBN model. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages, which are obvious and inherent to the system and method. It will be understood that certain features and subcombinations are of utility and may be employed without reference to other features and subcombinations. This is contemplated and within the scope of the claims.

The invention claimed is:

1. One or more computer-readable devices, not being a signal per se, having computer-executable instructions embodied thereon that when executed provide a method for medical resource forecasting, the method comprising:
   retrieving records of a first data set comprising historical medical data related to resource usage, wherein the historical medical data related to resource usage comprises usage determination data and context determination data;
   processing the records to determine a Bayesian network model including Bayesian node elements, wherein processing comprises:
   applying resource usage determination data to incorporate resource need as a hidden state of said Bayesian network, and
   applying context determination data to incorporate context data as observable states of said Bayesian network;
   producing a simplified model, based on analyzing the Bayesian network model;
   generating a predictive model using said simplified model; and
   running the predictive model to generating a forecast of resource needs.

2. The computer-readable media of claim 1, wherein the predictive model is an Auto Regressive Integrated Moving Average (ARIMA) model which is estimated based on the simplified model.

3. The computer-readable media of claim 1, wherein the predictive model is an ARIMA model which is estimated based on the first data set reduced as a function of the simplified model.

4. The computer-readable media of claim 1, wherein the usage determination data comprises actual usage data and data which is indicative of resource application error.

5. The computer-readable media of claim 1, wherein analyzing comprises comparing the absolute Z-score of one of more node elements to a threshold.

6. The computer-readable media of claim 1, wherein analyzing comprises determining a rank order of absolute Z-score for two or more node elements.

7. The computer-readable media of claim 1, further comprising validating the simplified model by comparing predicted resource usage to actual resource usage for a second data set.

8. The computer-readable media of claim 7, wherein said second data set is derived from the first data set.

9. The computer-readable media of claim 1, further comprising:
   receiving a schedule of resources; and
   comparing the forecast of resource needs to the schedule of resources to determine one or more differences.

10. The computer-readable media of claim 9, further comprising:
    based on the determined one or more differences, automatically altering the schedule of resources.

11. The computer-readable media of claim 9, further comprising:
    based on the determined one or more differences, generating a notice for notifying a medical resource administrator.

12. A method for medical resource forecasting comprising:
    receiving records of a first data set comprising historical medical data related to resource usage, wherein the historical medical data related to resource usage comprises usage determination data and context determination data;
    from the records of the first data set, determining a Bayesian network model including Bayesian node elements, wherein the step of determining the Bayesian network model comprises:
    applying resource usage determination data to incorporate resource need as a hidden state of said Bayesian network,
    applying context determination data to incorporate context data as observable states of said Bayesian network;
    analyzing the Bayesian network model to determining a simplified model;
    generating a predictive model using said simplified model; and
    applying the predictive model to determine future resource needs.

13. The method of claim 12, wherein the predictive model is an Auto Regressive Integrated Moving Average (ARIMA) model which is estimated based on the simplified model.

14. The method of claim 12, wherein the usage determination data comprises actual usage data and data which is indicative of resource application error.

15. The computer-readable media of claim 12, wherein analyzing comprises comparing the absolute Z-score of one of more node elements to a threshold.

* * * * *